2,850,398

Patented Sept. 2, 1958

2,850,398

DEXTRAN BONE GLUE ADHESIVES

Everett E. Witt and Frederick W. Holt, Jr., Dayton, Ohio, assignors to The Commonwealth Engineering Company of Ohio, Dayton, Ohio No Drawing. Application June 18, 1956
Serial No. 591,802

20 Claims. (Cl. 106—129)

This invention relates to new adhesive compositions. More particularly, the invention relates to bone-glue based compositions having improved properties.

Compositions based on bone-glue have been used as adhesives. However, the known compositions have not been entirely satisfactory from the viewpoint of tack, water resistance, "grab" or the range of viscosities obtainable by mixing the bone-glue with water or aqueous media. Also, the bone-glue is degraded by bacteria and enzymes to which the compositions are exposed in use, the degradation having an adverse effect on the adhesiveness of the compositions.

The object of this invention is to provide new adhesive compositions the major adhesive constituent of which is bone-glue, but which have improved characteristics, including resistance to bacterial and enzymic attack, as compared to the known adhesives based on bone-glue.

This and other objects are accomplished by the present invention which provides new, improved adhesives comprising bone-glue and, as modifier, a selected dextran or mixture of selected dextrans, with or without the inclusion of a plasticizer.

The dextrans comprise a group of polysaccharides which can be obtained by the action on sucrose of selected bacteria such as those of the *Leuconostoc mesenteroides* and *L. dextranicum* types or of the enzyme dextransucrase produced by the bacteria.

At present, ninety-six dextrans have been investigated by the Starch and Dextrose Section, Northern Utilization Research Branch, Peoria, Ill., and designated by a numeral identifying the strain of bacteria cultivated to produce the enzyme, preceded by the letters NRRL–B——. The constant feature of these dextrans is their structural component which appears to be almost exclusively the anhydroglucopyranosidic unit of alpha-configuration. The 1,6-glucosidic linkages constitute from 50% to 97% of the total linkages.

It is found, in accordance with this invention, that specific dextrans having special characteristics have the capacity, when incorporated in adhesive compositions the primary binder of which is bone-glue, to enhance the properties, and hence the usefulness, of the compositions. The special dextrans which have this capacity are characterized by maximum molecular linearity as indicated by a high alpha-1,6 to non-1,6 repeating glucosidic ratio. Specifically, in these selected dextrans 86% to 97% of the glucosidic linkages are 1,6 linkages. The dextrans are further characterized in that they form stable aqueous solutions of at least 10% concentration, either merely by mixing with water, or by such expedients as the application of heat to facilitate the dissolution or by gradually working water into the particulate dextran so that each particle becomes dispersed in its own dense paste and then adding water to the desired fluidity. An additional characteristic of the selected dextrans, and a requirement for the present purposes, is that aqueous 10% solutions thereof have, at room temperature, viscosities in the range 30 to 200,000 centipoises determined with the Brookfield viscometer. Mixtures of two or more specifically different dextrans which mixtures, in 10% aqueous solution, have viscosities in the stated range, may be used.

Typical dextrans which meet the present requirements include the following NRRL types: B–1146, –512, –742, –1397, –641, –1064, –1066, –1106, –1119, –1382, –1383, –1308, –1394, –1255 and –1407.

The molecular weight of the dextran obtained by inoculating a sucrose-containing nutrient medium with a whole culture of the selected bacterium, or with the enzyme separated from the culture, may depend on the percent sucrose in the nutrient. Thus, at 10% sucrose levels the molecular weight of the dextran formed and precipitated from the fermentate is extremely high, estimated in the millions. At higher sucrose concentrations such as 20% the molecular weight of the dextran while still high as compared to that of other organic materials, is sometimes lower than the molecular weight of dextran produced in the media made up with the smaller sucrose concentrations. The native dextrans produced under conditions of varying sucrose levels, and otherwise meeting the aforesaid specifications, may be used in the practice of this invention.

In some cases, also, the dextran is structurally heterogeneous and can be separated into dextrans belonging in different classes ranging from readily or ultimately water-soluble dextrans meeting the present viscosity requirements to water-insoluble dextrans the insolubility of which increases progressively with increase in the content of non-1,6 linkages. Such dextrans as may be obtained by fractionation of a structurally heterogeneous dextran before or after isolation from the fermentate, have the characteristics aforesaid, and can be dissolved in water to give solutions of the viscosity indicated may also be used in preparing the present adhesive compositions. Dextrans which are structurally heterogeneous include those designated as NRRL–B–1142, –1192, –1255, –1351, and –1374.

Dextran partial hydrolyzates which meet the present requirements and obtained by hydrolyzing native dextran to segments of lower molecular weight may be used, also.

If the other requirements are met, the dextran may have a molecular weight between 20,000 and that of native dextran.

The selection of the dextran or of mixtures of dextrans to be used from those meeting the requirements set forth above in preparing the new adhesive compositions, depends on the characteristics desired for the adhesive compositions. An extremely wide choice is possible so that adhesive compositions adapted to a wide variety of uses under different sets of conditions are made available by the present invention.

In preparing the instant compositions, the particulate dextran and dry particulate bone-glue may be blended or milled together in any suitable device to produce powders which retain their free-flowing properties at relative humidities as high as 95%. The proportion of the selected dextran component used in preparing these dry powders is from 5% to 10% by weight. The powders may be marketed as such and dissolved in water prior to use.

Liquid adhesive compositions according to the invention can be prepared for marketing as such by soaking the bone-glue in water, heating the soaked glue to 155–165° F. until the product is smooth, adding the selected dextran to the mass as soon as it is smooth, and then cooking the mass at 155–165° F. for 10 to 15 minutes. The dextran is completely dissolved during the cooking period.

The dextrans as defined herein are completely compatible in the glue formulations in concentrations of 5% to 10% by weight based on the combined weights of the glue and dextran, and are more compatible with the glue than are various other substances that have been proposed as adjuvants or modifiers in bone-glue adhesives, including polyvinyl alcohols.

Plasticizers may be incorporated in the compositions in an amount of about 5% by weight of the total solids weight. Examples of solid plasticizers which may be used include urea, thiorea, sodium nitrate, sodium thiocyanate, potassium thiocyanate, potassium nitrate, calcium chloride, magnesium chloride, zinc chloride, sodium lactate, sodium acetate, and sorbitol.

Examples of liquid plasticizers to be used include glycerine, ethylene glycol, diethylene glycol, and propylene glycol.

In preparing the aqueous compositions, the plasticizer is usually added to the smooth mass obtained by heating the soaked glue with, or at the same time as, the dextran, at the elevated temperature of 155–165° F.

The following typical formulations based on bone-glue and L. m. B–512 native dextran are given as illustrative of the new adhesive compositions—

| | Parts by weight |
|---|---|
| 1. Water | 100 |
| Bone-glue | 95 |
| Dextran | 5 |
| 2. Water | 100 |
| Bone-glue | 90 |
| Dextran | 5 |
| Glycerin | 5 |
| 3. Bone-glue | 95 |
| Dextran | 5 |
| 4. Bone-glue | 90 |
| Dextran | 5 |
| Sorbitol | 5 |

The up-grading influence of the selected dextrans on the viscosity of the bone-glue adhesive formulations is shown (items A and B) in Table I below. The formulations were prepared containing 50% total solids, at least 90% of the solids content being made up of the bone-glue. The viscosities were determined in centipoises with a Brookfield viscometer using a No. 4 spindle at 20 R. P. M. The viscosities for A and B should be compared with items C and D, adhesives made up with bone-glue but not containing the dextran.

*Table I*

| Formulation, percent total solids | Centipoises at 130° F. | |
|---|---|---|
| | No plasticizer | 5% glycerin |
| A. Bone glue, 95 Dextran (86–97% 1,6 linkages), 5 | 2,150 | 1,900 |
| B. Bone-glue, 90 Dextran (86–97% 1,6 linkages), 10 | 3,450 | 2,700 |
| C. Bone-glue, 100 | 1,600 | |
| D. Bone glue, 95 | | 1,400 |

An outstanding advantage of these selected dextrans for use in the new compositions is that the dextran improves the viscosity and other properties without decreasing the water-resistance of the bone glue. In fact, as is shown by a comparison of the water-resistance of items A and B in Table II, with that of items C and D, the dextran actually increases the water-resistance. This is an unexpected result in view of the hydroxylated character of the dextrans.

The data given in Table II were obtained in the following manner:

The adhesives were applied in a thin film to No. 60 coated lithograph paper and air dried for 24 hours. The paper was then cut into segments 4' x 2.75' to insure uniform surface area of the samples. The cut papers were oven-dried at 110° C. and weighed on an analytical balance. They were then submerged in water at 20° C. for exactly 20 seconds, re-dried at 110° C. and weighed a second time to determine the amount of adhesive dissolved from the surface. This amount is shown in grams, in the Table.

*Table II*

| Formulations, percent of total solids | Adhesive dissolved | |
|---|---|---|
| | No plasticizer | 5% glycerin |
| A. Bone glue, 95 Dextran (86–97% 1,6 linkages), 5 | 0.0069 | 0.0147 |
| B. Bone glue, 90 Dextran (86–97% 1,6 linkages), 10 | 0.0089 | 0.0207 |
| C. Bone glue, 100 | 0.0092 | |
| D. Bone glue, 95 | | 0.0205 |

The data show that the dextran increases the water-resistance in the presence or absence of a plasticizer.

On testing, the dextran-modified adhesive compositions based on bone glue proved to have excellent tack, superior to that obtainable with either dextran or bone glue alone, and "quick grab." The latter term refers to the rapidity of bonding between two substrates at least one of which is coated with the adhesive composition when the adhesive is moistened and the two substrates are pressed together.

These new compositions are remoistenable to adhesive condition. That is to say, the compositions may be applied to paper or any other suitable substrate, dried in the air or by any suitable means, and subsequently activated to adhesive condition by moistening. Thus paper, for example wallpaper, may be coated with the adhesive composition, the latter dried to a non-tacky firmly adherent film, and the paper rolled upon itself without blocking and subsequently unrolled, the dry adherent film moistened to adhesive condition, and the paper hung. Those dextrans in the group or class defined herein which may be dissolved in water under special conditions such as NRRL–B–1254 native dextran, for instance, are more water-resistant under ordinary conditions. Such water-resistance enhances the value of those dextrans as modifiers in the bone glue compositions to be used as remoistenable adhesives.

Dextrans, or at least some of them, have been found to have adhesive properties and adhesive compositions based on such dextrans may be used for purposes for which a high degree of water-resistance, tack and "quick grab" are not required. However, such dextran-based adhesives do not have the water-resistance, tack or "grab" of the present bone glue compositions in which the dextran is a minor component and is essentially a modifier for the bone glue, as is shown by comparative tests.

It appears that, in combination, the bone glue and selected dextran or mixture of selected dextrans act on one another in some fashion to yield the improved adhesives.

The compositions of the invention are generally useful adhesives which may be tailored to particular purposes by selection of the dextran component the aqueous 10% solutions of which have viscosities varying in the range 30 to 200,000 centipoises. For some industrial uses, the compositions may be modified in various respects for instance by the inclusion of small amounts (up to 5% by weight based on the composition weight) of pigments and/or of inert fillers such as finely ground mica, ground silica (quartz) and ground glass.

Some changes and modifications may be made in the compositions as specifically discussed herein, for instance in the selection of the particular dextran component and plasticizer used. Such changes can be made without departing from the spirit and scope of the invention and therefore it will be understood that it is not intended to limit the invention except as defined in the appended claims.

What is claimed is:

1. An adhesive composition based on bone glue and containing, in addition to the bone glue, a dextran component having maximum molecular linearity as indicated by a high alpha-1,6 to non-1,6 repeating glucosidic ratio, the dextran being present in an amount of 5% to 10% by weight based on the combined weights of the bone glue and dextran, the water resistance, tack, and resistance to bacterial and enzymic attack as well as the grab of the composition being upgraded by the dextran as compared to those properties normally exhibited by adhesives based on bone-glue but not containing said dextran.

2. An adhesive composition based on bone glue and containing, in addition to the bone glue, dextran 86% to 97% of the glucosidic linkages of which are 1,6 linkages, the dextran forming aqueous solutions of at least 10% concentration, having a molecular weight between 20,000 and that of native, unhydrolized dextran, and being present in the composition in an amount of 5% to 10% by weight based on the combined weights of the bone glue and dextran, the water resistance, tack, and resistance to bacterial and enzymic attack as well as the grab of the composition being upgraded by the dextran as compared to those properties normally exhibited by adhesives based on bone-glue but not containing said dextran.

3. An adhesive composition consisting essentially of water, bone glue and dextran 86% to 97% of the glucosidic linkages of which are 1,6 linkages, the dextran forming aqueous solutions of at least 10% concentration, having a molecular weight between 20,000 and that of native, unhydrolyzed dextran, and being present in the composition in an amount of 5% to 10% by weight based on the combined weights of the bone glue and dextran, the water-resistance, tack, and resistance to bacterial and enzymic attack as well as the grab of the composition being upgraded by the dextran as compared to those properties normally exhibited by adhesives based on bone-glue but not containing said dextran.

4. An adhesive composition based on bone glue and containing, in addition to the bone glue, dextran 86% to 97% of the glucosidic linkages of which are 1,6 linkages, the dextran forming aqueous solutions of at least 10% concentration, having a molecular weight between 20,000 and that of native, unhydrolyzed dextran, and being present in the composition in an amount of 5% by weight based on the combined weights of the bone glue and dextran, the water-resistance, tack, and resistance to bacterial and enzymic attack as well as the grab of the composition being upgraded by the dextran as compared to those properties normally exhibited by adhesives based on bone-glue but not containing said dextran.

5. An adhesive composition based on bone glue and containing, in addition to the bone glue, dextran 86% to 97% of the glucosidic linkages of which are 1,6 linkages, the dextran forming aqueous solutions of at least 10% concentration, having a molecular weight between 20,000 and that of native, unhydrolyzed dextran, and being present in the composition in an amount of 10% by weight based on the combined weights of the bone glue and dextran, the water-resistance, tack, and resistance to bacterial and enzymic attack as well as the grab of the composition being upgraded by the dextran as compared to those properties normally exhibited by adhesives based on bone-glue but not containing said dextran.

6. An adhesive composition based on bone glue and consisting essentially of water, bone glue and dextran 86% to 97% of the glucosidic linkages of which are 1,6 linkages, the dextran forming aqueous solutions of at least 10% concentration, having a molecular weight between 20,000 and that of native, unhydrolyzed dextran, and being present in the composition in an amount of 5% by weight based on the combined weights of the bone glue and dextran, the water-resistance, tack, and resistance to bacterial and enzymic attack as well as the grab of the composition being upgraded by the dextran as compared to those properties normally exhibited by adhesives based on bone-glue but not containing said dextran.

7. An adhesive composition based on bone glue and consisting essentially of water, bone glue and dextran 86% to 97% of the glucosidic linkages of which are 1,6 linkages, the dextran forming aqueous solutions of at least 10% concentration, having a molecular weight between 20,000 and that of native, unhydrolyzed dextran, and being present in the composition in an amount of 10% by weight based on the combined weights of the bone glue and dextran, the water-resistance, tack, and resistance to bacterial and enzymic attack as well as the grab of the composition being upgraded by the dextran as compared to those properties normally exhibited by adhesives based on bone-glue but not containing said dextran.

8. An adhesive composition based on bone glue, said composition containing, in addition to the bone glue, a plasticizing agent and dextran 86% to 97% of the glucosidic linkages of which are 1,6 linkages, the dextran forming aqueous solutions of at least 10% concentration and having a molecular weight between 20,000 and that of native, unhydrolyzed dextran, the dextran being present in an amount of 5% to 10% by weight on the total solids weight, and the plasticizing agent being present in an amount of up to 5% by weight on the total solids weight, the water-resistance, tack, and resistance to bacterial and enzymic attack as well as the grab of the composition being upgraded by the dextran as compared to those properties normally exhibited by adhesives based on bone-glue but not containing said dextran.

9. An adhesive composition based on bone glue and which can be applied to a substrate, dried, and subsequently activated to adhesive condition by moistening, said composition consisting essentially of water, bone glue and dextran 86% to 97% of the glucosidic linkages of which are 1,6 linkages, the dextran forming aqueous solutions of at least 10% concentration, having a molecular weight between 20,000 and that of native, unhydrolyzed dextran, and being present in the composition in an amount of 5% to 10% by weight on the combined weights of the bone glue and dextran, the water-resistance, tack, and resistance to bacterial and enzymic attack as well as the grab of the composition being upgraded by the dextran as compared to those properties normally exhibited by adhesives based on bone-glue but not containing said dextran.

10. An adhesive composition based on bone glue and which can be applied to a substrate, dried, and subsequently activated to adhesive condition by moistening, said composition consisting essentially of water, bone glue, and dextran 86% to 97% of the glucosidic linkages of which are 1,6 linkages, the dextran forming aqueous solutions of at least 10% concentration, having a molecular weight between 20,000 and that of native, unhydrolyzed dextran, and being present in an amount of 5% to 10% by weight on the total solids weight, the water-resistance, tack, and resistance to bacterial and enzymic attack as well as the grab of the composition being upgraded by the dextran as compared to those properties normally exhibited by adhesives based on bone-glue but not containing said dextran.

11. An adhesive composition based on bone glue, said composition containing, in addition to the bone glue, about 5% of glycerine and dextran 86% to 97% of the glucosidic linkages of which are 1,6 linkages, the dextran forming aqueous solutions of at least 10% concentration and having a molecular weight between 20,000 and that of native, unhydrolyzed dextran and being present in the composition in an amount of about 5% by weight on the total solids weight, the water-resistance, tack, and resistance to bacterial and enzymic attack as well as the grab of the composition being upgraded by the dextran as compared to those properties normally exhibited by adhesives based on bone glue but not containing said dextran.

12. An adhesive composition based on bone glue and consisting essentially of water, bone glue, about 5% of glycerine and dextran 86% to 97% of the glucosidic linkages of which are 1,6 linkages, the dextran forming aqueous solutions of at least 10% concentration, having a molecular weight between 20,000 and that of native, unhydrolyzed dextran and being present in the composition in an amount of about 5% by weight on the total solids weight, the water-resistance, tack, and resistance to bacterial and enzymic attack as well as the grab of the composition being upgraded by the dextran as compared to those properties normally exhibited by adhesives based on bone glue but not containing said dextran.

13. A liquid adhesive composition having a total solids content of 50% by weight made up of 90 to 95% bone glue and, conversely, 10% to 5% of dextran 86% to 97% of the glucosidic linkages of which are 1,6 linkages, the dextran having a molecular weight between 20,000 and that of native, unhydrolyzed dextran, the water-resistance, tack, and resistance to bacterial and enzymic attack as well as the grab of the composition being upgraded by the dextran as compared to those properties normally exhibited by adhesives based on bone-glue but not containing said dextran.

14. An aqueous adhesive composition having a total solids content of 50% by weight made up of 90 to 95% bone glue and, conversely, 10% to 5% of dextran 86% to 97% of the glucosidic linkages of which are 1,6 linkages, the dextran having a molecular weight between 20,000 and that of native, unhydrolyzed dextran, the water-resistance, tack, and resistance to bacterial and enzymic attack as well as the grab of the composition being upgraded by the dextran as compared to those properties normally exhibited by adhesives based on bone-glue but not containing said dextran.

15. An aqueous adhesive composition containing about 5% by weight of glycerine, about 90% of bone glue and about 5% of dextran 85% to 97% of the glucosidic linkages of which are 1,6 linkages, the dextran having a molecular weight between 20,000 and that of native, unhydrolyzed dextran, the water-resistance, tack, and resistance to bacterial and enzymic attack as well as the grab of the composition being upgraded by the dextran as compared to those properties normally exhibited by adhesives based on bone-glue but not containing said dextran.

16. An aqueous adhesive composition containing about 5% of sorbitol, about 90% of bone glue and about 5% of dextran 86% to 97% of the glucosidic linkages of which are 1,6 linkages, the dextran having a molecular weight between 20,000 and that of native, unhydrolyzed dextran, the water-resistance, tack, and resistance to bacterial and enzymic attack as well as the grab of the composition being upgraded by the dextran as compared to those properties normally exhibited by adhesives based on bone-glue but not containing said dextran.

17. A bone glue-based adhesive composition containing a dextran component characterized in that 10% aqueous solutions thereof have viscosities ranging from 30 to 200,000 centipoises as determined with the Brookfield viscometer, the water-resistance, tack, and resistance to bacterial and enzymic attack as well as the grab of the composition being upgraded by the dextran as compared to those properties normally exhibited by adhesives based on bone-glue but not containing said dextran.

18. The method of preparing an aqueous adhesive composition based on bone glue which comprises soaking from 90 to 95 parts by weight of bone glue in cold water, heating the soaked glue to 155–165° F. until a smooth mass is obtained, adding from 5 to 10 parts by weight of dextran 86% to 97% of the glucosidic linkages of which are 1,6 linkages and which has a molecular weight between 20,000 and that of native unhydrolyzed dextran to the smooth mass at the elevated temperature, and cooking the mass at 155–165° F. for 10 to 15 minutes, to obtain a composition the resistance to water, tack, grab, and resistance to bacterial and enzymic attack of which are upgraded by the dextran as compared to those properties normally exhibited by adhesives based on bone-glue but not containing said dextran.

19. The method of making a plasticized liquid adhesive composition based on bone glue which comprises soaking about 90 parts of bone glue in cold water, heating the soaked glue at 155–165° F. until a smooth mass is obtained, adding to the smooth mass, at the elevated temperature, about 5 parts of a plasticizing agent and about 5 parts of dextran 86% to 97% of the glucosidic linkages of which are 1,6 linkages and which has a molecular weight between 20,000 and that of native, unhydrolyzed dextran, and cooking the mass at 155–165° F. for 10 to 15 minutes, to obtain a composition the resistance to water, tack, grab, and resistance to bacterial and enzymic attack of which are upgraded by the dextran as compared to those properties normally exhibited by adhesives based on bone-glue but not containing said dextran.

20. An adhesive composition based on bone glue and containing, for upgrading the resistance to water, tack, grab, and resistance to bacterial and enzymic attack thereof, native, unhydrolyzed dextran 86% to 97% of the glucosidic linkages of which are 1,6 linkages and which forms aqueous solutions of at least 10% concentration.

References Cited in the file of this patent

UNITED STATES PATENTS

| | | |
|---|---|---|
| 250,675 | Osgood | Dec. 13, 1881 |
| 676,095 | Mayer | June 11, 1901 |
| 2,671,779 | Gaver et al. | Mar. 9, 1954 |
| 2,757,608 | Schoech | Aug. 7, 1956 |